United States Patent [19]

Shirai

[11] Patent Number: 5,263,381
[45] Date of Patent: Nov. 23, 1993

[54] BALL SCREW
[75] Inventor: Takeki Shirai, Ichikawa, Japan
[73] Assignee: THK Co., Ltd., Tokyo, Japan
[21] Appl. No.: 850,709
[22] Filed: Mar. 13, 1992

[30] Foreign Application Priority Data

Mar. 15, 1991 [JP] Japan .................................. 3-074218

[51] Int. Cl.⁵ .............................................. F16H 25/22
[52] U.S. Cl. ......................................... 74/441; 74/459
[58] Field of Search ................................ 74/441, 459

[56] References Cited

U.S. PATENT DOCUMENTS

| | | | |
|---|---|---|---|
| 2,643,845 | 6/1953 | Baker | 74/441 X |
| 2,919,596 | 1/1960 | Kuehl | 74/441 |
| 3,270,569 | 9/1966 | Berman et al. | 74/441 X |
| 3,720,116 | 3/1973 | Better et al. | 74/459 |
| 4,896,552 | 1/1990 | Virga | 74/441 X |

FOREIGN PATENT DOCUMENTS

| | | |
|---|---|---|
| 42-3366 | 2/1942 | Japan . |
| 55-57748 | 4/1980 | Japan . |
| 57-27558 | 2/1982 | Japan . |
| 57-107461 | 7/1982 | Japan . |
| 57-160445 | 10/1982 | Japan . |
| 58-225255 | 12/1983 | Japan . |
| 64-64747 | 3/1989 | Japan . |
| 2-38741 | 2/1990 | Japan ............... 74/441 |
| 2-221747 | 9/1990 | Japan . |
| 3-41248 | 2/1991 | Japan ............... 74/441 |
| 752459 | 7/1956 | United Kingdom ......... 74/441 |
| 1378048 | 12/1974 | United Kingdom . |
| 1378049 | 12/1974 | United Kingdom . |

Primary Examiner—Allan D. Herrmann
Attorney, Agent, or Firm—Armstrong, Westerman, Hattori, McLeland & Naughton

[57] ABSTRACT

A ball screw comprising a threaded rod and a ball nut making a rectilinear motion around the rod as the rod is rotated. A first load ball groove and a second load groove which have an offset relation to each other are formed in the inner surface of the ball nut. A pre-load is imparted to ball bearings rolling in these two load grooves. The ball nut has a resilient portion between the first and second load ball grooves. The resilient portion can be displaced axially. Any excessive pre-load created by the error introduced either in the lead of the ball-rolling groove or in the lead of the first or second load ball groove is absorbed by the resilient portion. Consequently, the novel ball screw is superior in accuracy to the prior art ball screw, and is easier to fabricate.

5 Claims, 5 Drawing Sheets

BALL SCREW

BACKGROUND OF THE INVENTION

1. Field of the Invention

The present invention relates to a ball screw which is used in various industrial machines and acts to convert a rectilinear motion to a rotary motion or vice versa.

2. Description of the Related Art

A conventional ball screw comprises a threaded rod and at least one ball nut. The threaded rod has a ball-rolling groove formed spirally with a given lead. Ball bearings are constrained to roll in this groove. The ball nut has a load ball groove and a ball return passage. The load ball groove is formed spirally with the same lead as the ball-rolling groove. The ball return passage permits the ball bearings to circulate from one end of the load ball groove to the other end. It is possible to take a rectilinear motion from one of the threaded rod and the ball nut by imparting a rotary motion to the other.

During the use of this ball screw, it is customary to impart a pre-load to the ball nut to eliminate any axial gap, to increase the rigidity against axial load for avoiding backlash, and to improve the accuracy of the feeding of rectilinear motion.

A typical method of imparting a pre-load to the ball screw uses two ball nuts and consists in imparting the pre-load to the screw while exerting a tensile force or compressive force between these two ball nuts. This is a so-called double-nut method. In particular, this method is classified into a constant position pre-loading method in which a spacer having a thickness corresponding to the amount of the pre-load is inserted between one pair of ball nuts and a constant pressure pre-loading method in which a pre-load is imparted by making use of the resilient force of a spring sandwiched between a pair of ball nuts.

In the former constant position pre-loading method, the two ball nuts are tightened together rigidly via the spacer. Therefore, if the lead of the threaded rod or the diameter of the rod contains an error, then the ball bearings are resiliently deformed nonuniformly. Consequently, the pre-load is nonuniform among the ball bearings. As a result, the torques applied to the ball nuts are different from each other. In the latter constant pressure pre-loading method, such a problem does not take place, because the amount of resilient deformation of the ball bearings is maintained constant at all times by the action of the spring. However, a decrease in the rigidity is unavoidable. Furthermore, it is difficult to mount the spring in such a way that an appropriate pre-load is obtained. Also, in either method, an adequate pre-load is not imparted where the ball nuts rotate relative to each other. For this reason, it is required that the two ball nuts be coupled together without permitting them to rotate relative to each other. Therefore, the number of components is increased. Also, the number of assembly steps is increased. Another problem is that a smooth rotary motion cannot be obtained unless the axes of the two ball nuts agree strictly.

In these situations, a so-called offset pre-loading method has been proposed to impart a pre-load with a single ball nut. Specifically, the ball nut is provided with a spiral load groove receiving ball bearings. The lead of this groove is increased and decreased at certain locations, depending on the amount of the pre-load, so that a ball contact structure similar to that derived by the above-described constant position pre-loading method is obtained. In this method, the pre-load is given with the single ball nut. The total length of the nut is reduced compared with that of the double nut structure. Also, the weight is reduced. Furthermore, a miniaturization can be realized. In addition, less labor is needed to assemble the ball screw.

Nonetheless, even in this offset pre-loading method, if the lead of the threaded rod or the diameter of the rod contains an error due to machining error, then the torque applied to the ball nut is nonuniform, in the same way as in the constant position pre-loading method. Additionally, any radial gap produces an axial gap. This deteriorates the feeding accuracy.

In this manner, the prior art pre-loading methods have problems concerning the manufacture of the ball screw and regarding the accuracy of motion and fail to satisfy all the users and manufacturers of these ball screws.

SUMMARY OF THE INVENTION

It is an object of the present invention to provide a ball screw which is easy to fabricate and excellent in accuracy.

The above object is achieved in accordance with the teachings of the invention by a ball screw comprising: a threaded rod having a ball-rolling groove formed spirally with a given lead; a ball nut; a first load ball groove formed spirally in the inner surface of the ball nut with the same lead as that of the ball-rolling groove; a second load ball groove formed spirally in the inner surface of the ball nut with the same lead as that of the ball-rolling groove; a resilient portion formed on the ball nut between the first and second load ball grooves; and a multiplicity of ball bearings each constrained between the ball-rolling groove in the threaded rod and the first or second load ball groove so as to roll. The resilient portion can be displaced axially. The distance between the first and second load ball grooves is set larger or smaller than an integral multiple of the lead of the ball-rolling groove.

In this structure, the distance between the first and second load ball grooves is larger or smaller than an integral multiple of the lead of the ball-rolling groove. Therefore, the ball contact structure is similar to the ball contact structure in the offset pre-loading ball screw. A pre-load is given to the ball nut. Formed between the first and second load ball grooves is the resilient portion of the ball nut which is displaced axially. This resilient portion serves to take up excessive pre-load due to the error introduced in the lead of the threaded rod or due to the error contained in the diameter of the rod. This ensures that a constant pre-load is imparted to the ball nut at all times. Hence, the accuracy of the movement is enhanced.

Because both first and second load ball grooves are formed in the single ball nut to impart a pre-load, cumbersome adjustments and assembly operations which would have been needed in the case of the double nut structure are dispensed with. In consequence, the productivity is improved greatly.

In this invention, a pre-load is provided by a combination of two factors. One factor is the appropriate selection of the distance between the first and second load grooves, while the other is the selection of a strength of the resident force of the resilient portion. It is clear that pre-load is provided to the ball screw, when the distance between the first and second load grooves is slightly larger or slightly smaller than an integral multiple of the lead of the ball-rolling groove. On the other hand, the resilient portion expands or contracts for releasing the pre-load imparted the ball screw, with the result that the resilient force is sure to occur at the resilient portion. Thus, it is a tacit feature that the distance between the first and second load grooves is slightly larger or slightly smaller than an integral multiple of the lead of the ball-rolling groove, for causing said resilient force.

Accordingly this invention may be expressed another way in that the pre-load is provided by the resilient force of the resilient portion.

If the resilient portion expands or contracts, the pre-load corresponding to the selected distance between the first and second load grooves is released according to a quantity of expansion or contraction. But if the resilient portion hardly expands and contracts, the pre-load corresponding to the selected distance is imparted to the ball screw without any changes. After all, the pre-load imparted to the ball screw is freely adjustable by selecting a strength of resilient force of the resilient portion.

On the other hand, the resilient portion functions to keep the amount of the pre-load to a fixed level. For example, in the case of a threaded rod which has an error of the lead, in the case of an impact load acting upon the ball screw, the pre-load becomes temporally too much. But, in this invention, the resilient portion expands or contracts to release an excessive pre-load, so that pre-load imparted to the ball screw always remains at a predetermined level.

Other objects and features of the invention will appear in the course of the description thereof which follows.

DETAILED DESCRIPTION OF THE PREFERRED EMBODIMENTS

Figure 1:
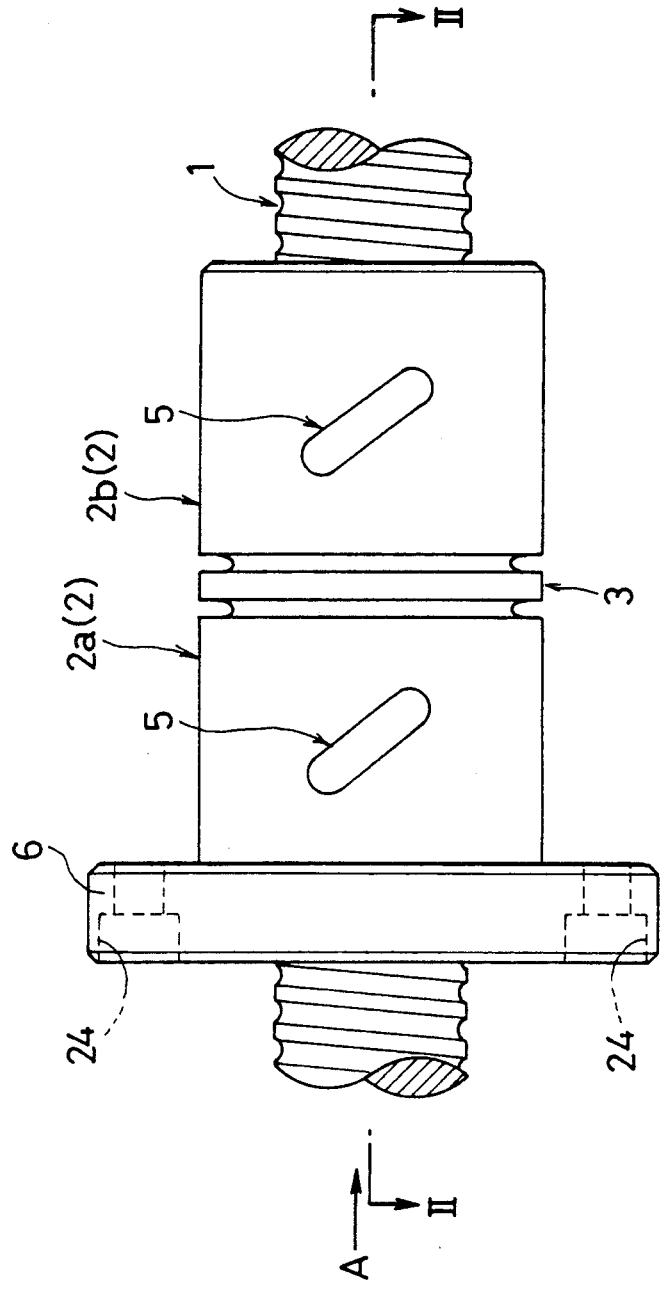
FIG. 1 is a side elevation of a ball screw according to the invention.

Referring to FIGS. 1-4, there is shown a ball screw embodying the concept of the present invention. This ball screw comprises a threaded rod 1, a ball nut 2 having a corrugated resilient portion 3 substantially in the axial center of the rod 1, and a plurality of ball bearings 4 sandwiched between the rod 1 and the nut 2. A groove 11 is formed spirally with a given lead L in the outer surface of the rod 1. The ball bearings 4 can roll in the spiral groove 11. As the rod 1 rotates, the ball nut 2 make a rectilinear motion around the rod 1. The ball bearings 4 act to sustain load.

Figure 2:
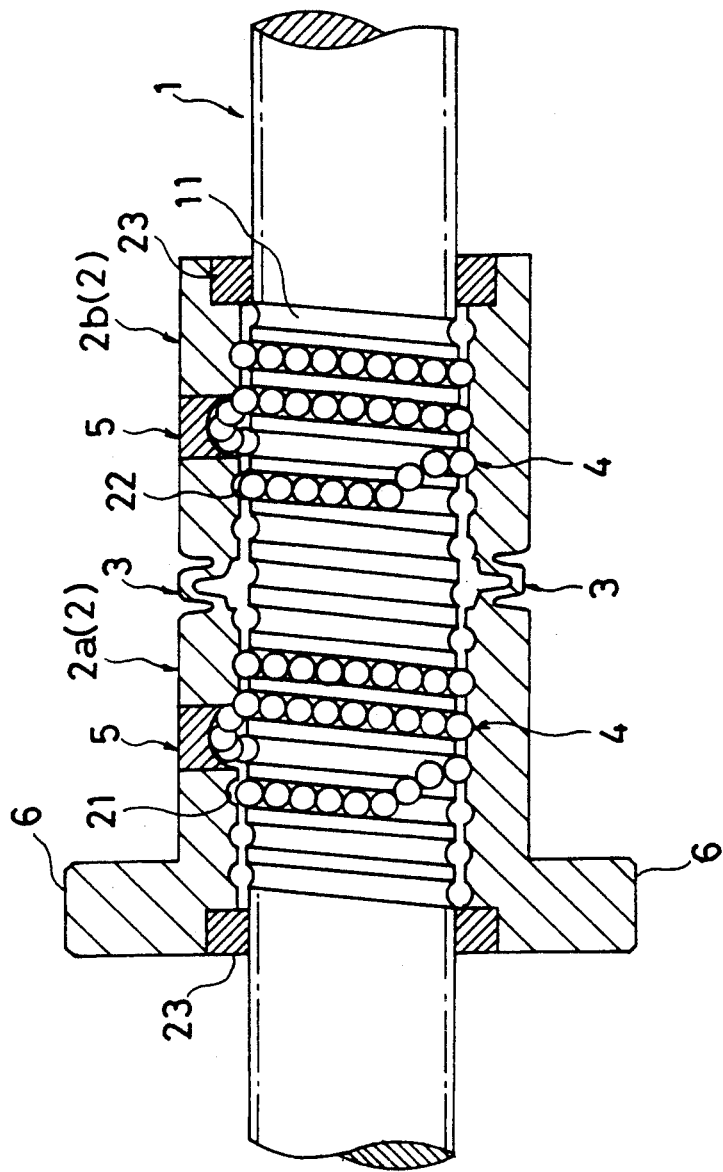
FIG. 2 is a cross-sectional view taken on line of FIG. 1.
Figure 3:
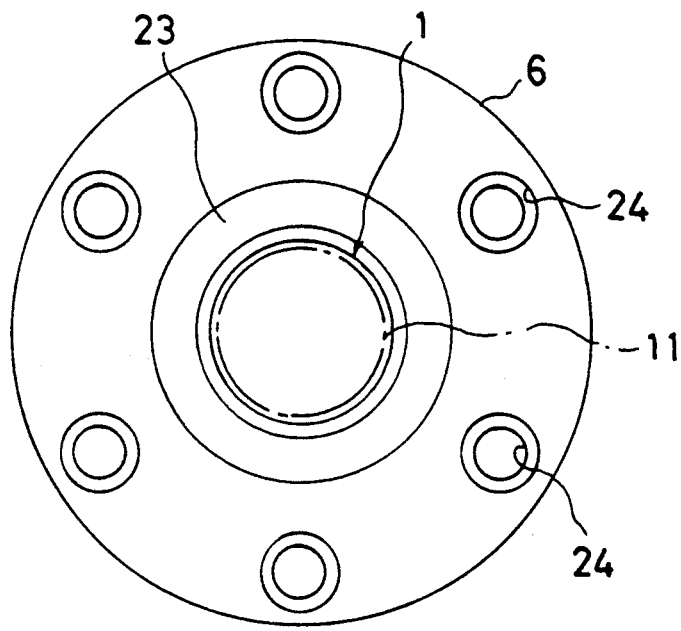
FIG. 3 is a side elevation of the ball screw shown in FIG. 1 as viewed from the direction indicated by the arrow A.

As shown in FIG. 2, the ball nut 2 comprises a first nut portion 2a and a second nut portion 2b which are coupled together by the resilient portion 3. A first load ball groove 21 is formed in the inner surface of the first nut portion 2a. Similarly, a second load ball groove 22 is formed in the inner surface of the second nut portion 2b. Three deflectors 5 which are regularly spaced from each other are fitted over each of the first and second nut portions 2a, 2b. The ball bearings 4 which roll down the load ball grooves 21 and 22 pass through the return grooves formed in the deflectors 5 and return to the previous turns of the grooves 21 and 22. In this way, the ball bearings 4 circulate through the endless path. Accordingly, each of the nut portions 2a and 2b has three rows of ball bearings which circulate endlessly. Seal members 23 prevent dust and other foreign matter from entering the hollow inside of the ball screw from the axial ends of the nut 2. Bolts (not shown) extend through mounting holes 24 and are screwed into a non-mounted portion (not shown).

The resilient portion 3 which couple together the first nut portion 2a and the second nut portion 2b is formed in the following sequence after the load ball grooves 21 and 22 are ground.

(1) The inner surface of the ball nut 2 is turned with a lathe to form a groove 31.

(2) After the whole ball nut 2 is carburized, it is quenched. The outer surface of the resilient portion 3 is coated with a protector to prevent the carburizer from penetrating the resilient portion.

(3) The protector is peeled off. The outer surface of the ball nut 2 is turned with a lathe to form grooves 32 and 33.

Where the resilient portion is formed by turning the single cylindrical member in this way, the following advantages can be obtained:

(a) In the step (3) described above, the amount of lathe turning and the angle can be set at will in forming the grooves 32 and 33 and, therefore, the spring constant of the resilient member can be easily adjusted.

(b) Since the axis of the first nut portion 2a is exactly coincident with the axis of the second nut portion 2b, a smoother rotary motion is obtained than in the prior art double nut structure in which two ball nuts are connected together by a spring.

(c) Since the resilient portion acts to absorb excessive load, the ball nut is prevented from cracking when an impulsive load acts.

Figure 4:
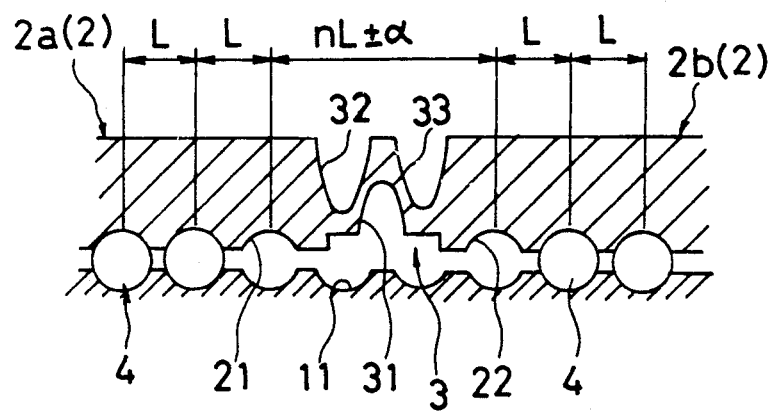
FIG. 4 is an enlarged cross section of main portions of the ball nut shown in FIG. 1.

In the present embodiment, a pre-load is applied to the ball nut 2 in the manner described now. As shown in FIG. 4, the lead of the first and second load ball grooves 21, 22 is the same as the lead L of the groove 11 formed in the threaded rod 1. The distance between the first groove 21 and the second groove 22 which are located on opposite sides of the resilient portion 3 is set smaller than an integral multiple of the lead L by $\alpha$ (0 21 $\alpha < 50$ μm), i.e., set equal to n L$-\alpha$, where n is an integer. Therefore, after the ball nut 2 has been mounted to the threaded rod 1, even if no external force acts on the ball nut 2, the ball bearings 4 rolling in the first groove 21 and the ball bearings 4 rolling in the second groove 22 are pulled toward the resilient portion 3. A pre-load having a magnitude corresponding to the value of $\alpha$ is imparted to the ball nut 2.

In the present embodiment, the distance between the load ball grooves 21 and 22 is set to n L$-\alpha$. It is also possible to set the distance larger than an integral multiple of the lead by $\alpha$, i.e., n L$+\alpha$. In this case, a compressive load acts on the ball bearings 4 rolling in the first groove 21 and also to the ball bearings 4 rolling in the second groove 22 such that all of these ball bearings 4 are forced toward the axial ends of the screw. Again, a pre-load having a magnitude corresponding to the value of $\alpha$ is imparted to the ball nut 2.

The ball nut 2 constructed in this way is bolted to a non-mounted portion such as a table via a jawlike flange 6 protruding from the outer surface of the first nut portion 2a. Under this condition, the ball nut 2 is used.

In this state, the resilient portion 3 functions in the manner described below. If any gap is created between each ball bearing 4 and the load ball groove 21 or 22 because of the error introduced in the lead of the threaded rod 1 or due to the error contained in the diameter of the rod, or if an excessive compressive force acts on the ball bearings 4, then the resilient portion 3 expands or contracts to absorb the gap or mitigate the compressive force. At the same time, a pre-load corresponding to the resilient force of the resilient portion 3 is applied to the ball nut 2. Consequently, a pre-load corresponding to the spring constant is imparted to the ball nut 2.

In the present embodiment, therefore, a substantially constant pre-load is kept applied to the ball nut 2 by the action of the resilient portion 3 if the lead of the threaded rod 1 or the diameter of the rod contains an error. In consequence, a stable motion is assured.

Figure 5A:
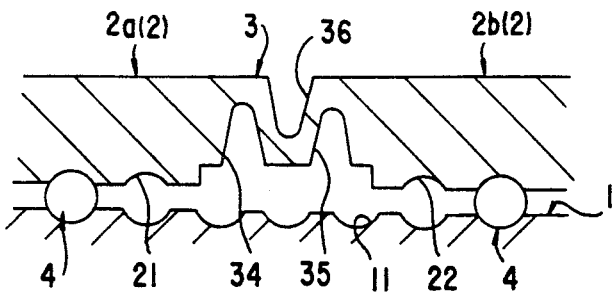
FIG. 5 is an enlarged cross section of a modification of the resilient portion of the ball nut shown in FIG. 1.
FIG. 5(B) is an enlarged cross section of a second modification of the resilient portion of the ball nut shown in FIG. 1.
Figure 5B:
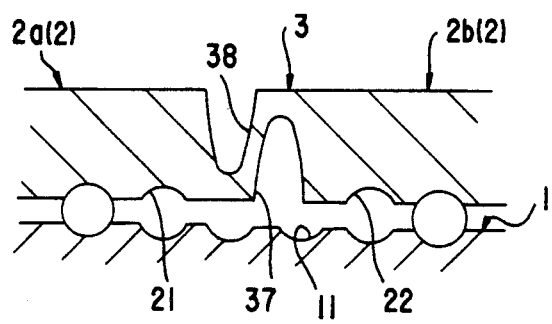

The resilient portion 3 can take other shapes as shown in FIG. 5 (A) and FIG. 5(B). In FIG. 5(A), two grooves 34 and 35 are formed in the inner surface of the ball nut 2. A groove 36 is formed in the outer surface. In FIG. 5(B), the inner and outer surfaces are provided with grooves 37 and 38, respectively. Accordingly, the above-described advantages can be had, irrespective of the shape of the resilient portion 3, as long as the corrugated resilient portion 3 is formed by forming circumferential grooves in the inner surface and the outer surface, alternately, of the ball nut 2 by lathe turning.

Figure 6:
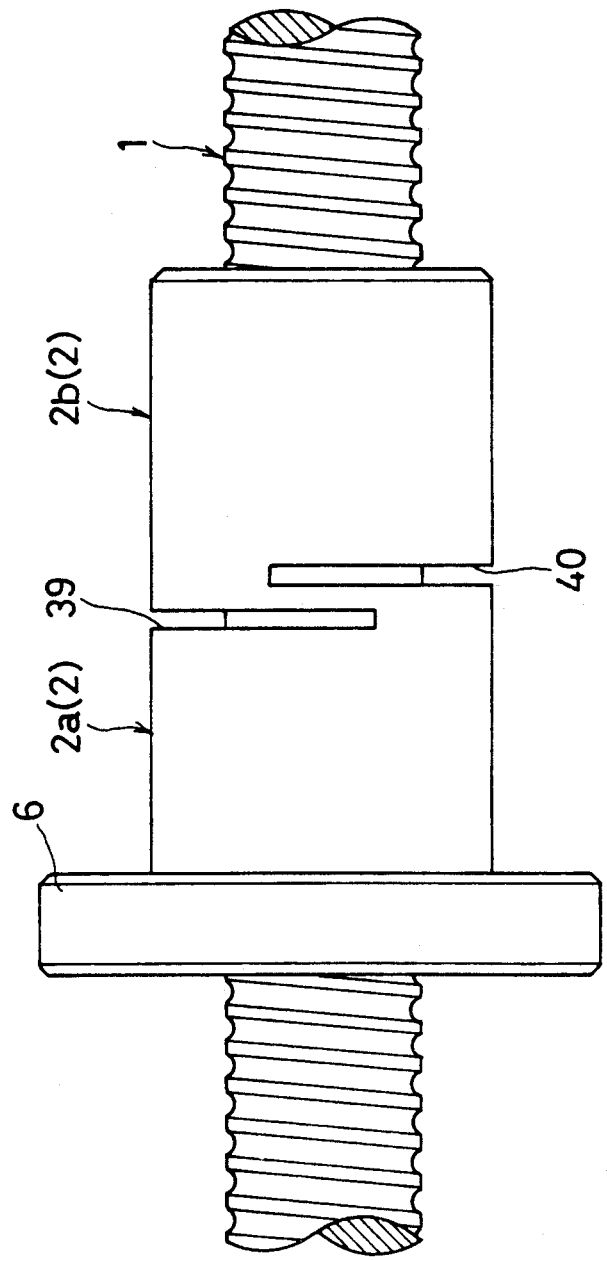
FIG. 6 is a side elevation of another ball screw according to the invention.

Referring next to FIG. 6, there is shown another ball screw according to the invention. This ball screw is similar to the ball screw already described in conjunction with FIGS. 1-4, except that a plurality of slits 39 and 40 extending radially of the ball nut 2 are formed in the outer surface of the resilient portion 3. This resilient portion 3 functions similarly to the resilient portion 3 of the first embodiment. Also, the spring constant of the resilient portion 3 can be adjusted arbitrarily by varying the distance between the adjacent slits 39 and 40. In addition, it is easy to supply oil into the ball nut through the slits 39 and 40.

Figure 7:
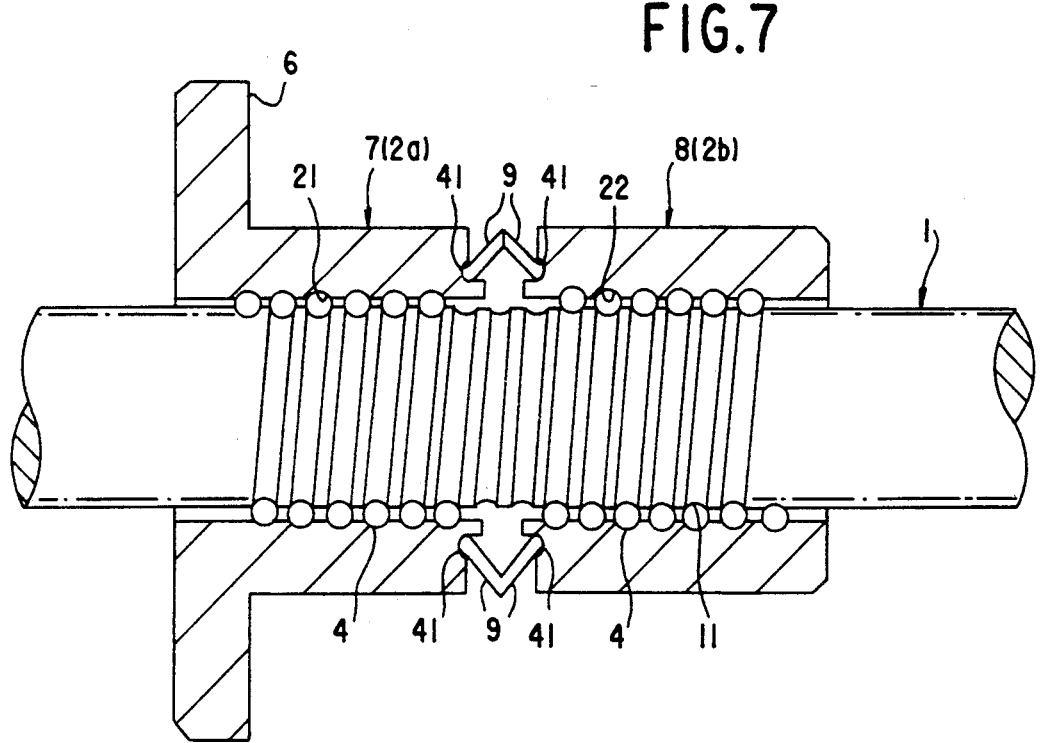
FIG. 7 is a side elevation of a further ball screw according to the invention.

Referring to FIG. 7, there is shown a further ball screw according to the invention. In this embodiment, the first nut portion 2a consists of a cylinder 7. Likewise, the second nut portion 2b consists of a cylinder 8. This ball screw is fabricated in the manner described now. Two belleville springs 9 are held between these cylinders 7 and 8. These components are bonded together by projection welding with welds 41. A first load ball groove 21 and a second load ball groove 22 are then formed in the welded components to form a ball nut 2. In this embodiment, the belleville springs 9 which couple together the two cylinders 7 and 8 act like the resilient member 3 of the first and second embodiments. The spring constant of the springs 9 can be adjusted at will by modifying the resilient force of the springs 9.

What is claimed is:

1. A ball screw comprising:

a threaded rod having a ball-rolling groove formed spirally with a given lead;

a ball nut including a first ball nut portion and a second ball nut portion;

a first load ball formed spirally in the inner surface of the first ball nut portion with the same lead as that of the ball-rolling groove;

a second load ball groove formed spirally in the inner surface of the second ball nut portion with the same lead as that of the ball-rolling groove;

a multiplicity of ball bearings each constrained between the ball-rolling groove in the threaded rod and the first or second load ball groove so as to roll;

a setting means for setting the distance between the first and second load ball grooves either larger or smaller than an integral multiple of the lead of the ball-rolling groove for imparting a pre-load to the ball nut;

a resilient member provided between the first and second ball nut portions, and maintaining a substantially constant pre-load applied on the ball bearings despite variations in the lead or the diameter of the threaded rod.

2. The ball screw of claim 1, wherein circumferential grooves are formed in the outer surface and the inner surface, alternately, of the ball nut to form the resilient portion which is corrugated.

3. The ball screw of claim 1, wherein radially extending plural slits are formed in the outer surface of the ball nut to form the resilient portion.

4. A ball screw comprising:

a threaded rod having a ball-rolling groove formed spirally with a given lead;

a first ball nut portion consisting of a first cylinder;

a second ball nut portion consisting of a second cylinder;

a first load ball groove formed spirally in the inner surface of the first ball nut portion with the same lead as that of the ball-rolling groove;

a second load ball groove formed spirally in the inner surface of the second ball nut portion with the same lead as that of the ball-rolling groove;

a multiplicity of ball bearings each constrained between the ball-rolling groove in the threaded rod and the first or second load ball groove so as to roll;

a setting means for setting the distance between the first and second load ball grooves either larger or smaller than an integral multiple of the lead of the ball-rolling groove for imparting a pre-load to the ball nut; and a plurality of springs connected between said first cylinder and second cylinder and separating said first and second ball nut portions, said plurality of springs forming a resilient portion being capable of axial displacement and maintaining a substantially constant pre-load applied on the ball bearings despite variations in the lead or diameter of the threaded rod.

5. A ball screw comprising:

a threaded rod having a ball-rolling groove formed spirally within a given lead;

a first ball nut portion consisting of a first cylinder;

a second ball nut portion consisting of a second cylinder;

a first load ball groove formed spirally in the inner surface of the first ball nut portion with the same lead as that of the ball-rolling groove;

a second load ball groove formed spirally in the inner surface of the second ball nut portion with the same lead as that of the ball-rolling groove;

a multiplicity of ball bearings each constrained between the ball-rolling groove in the threaded rod and the first or second load ball groove so as to roll;

a setting means for setting the distance between the first and second load ball grooves either larger or smaller than an integral multiple of the lead of the ball-rolling groove;

a plurality of belleville springs bonded between said first and second cylinders by projection welding and separating said first and second ball nut portions, forming a resilient portion being capable of axial displacement.

* * * * *